United States Patent
Wang et al.

(10) Patent No.: US 11,843,464 B2
(45) Date of Patent: Dec. 12, 2023

(54) MULTI-BAND TRANSMISSION METHOD AND APPARATUS

(71) Applicant: Huawei Technologies Co., Ltd., Shenzhen (CN)

(72) Inventors: Ying Wang, Shenzhen (CN); Yunbo Li, Shenzhen (CN); Yuchen Guo, Shenzhen (CN); Guogang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 474 days.

(21) Appl. No.: 17/182,487

(22) Filed: Feb. 23, 2021

(65) Prior Publication Data
US 2021/0176019 A1    Jun. 10, 2021

Related U.S. Application Data

(63) Continuation of application No. PCT/CN2019/101447, filed on Aug. 19, 2019.

(30) Foreign Application Priority Data

Aug. 24, 2018 (CN) .......................... 201810974728.2

(51) Int. Cl.
*H04L 1/18* (2023.01)
*H04L 1/1829* (2023.01)
(Continued)

(52) U.S. Cl.
CPC .......... *H04L 1/1861* (2013.01); *H04L 1/1607* (2013.01); *H04L 47/34* (2013.01); *H04W 72/0453* (2013.01)

(58) Field of Classification Search
None
See application file for complete search history.

(56) References Cited

U.S. PATENT DOCUMENTS

| 2007/0002810 A1 | 1/2007 | Trainin et al. |
| 2009/0235066 A1 | 9/2009 | Ptasinski et al. |

(Continued)

FOREIGN PATENT DOCUMENTS

| CN | 101933271 A | 12/2010 |
| CN | 101977100 A | 2/2011 |

(Continued)

OTHER PUBLICATIONS

IEEE 802.11ad standard, "Part 11: Wireless LAN Medium Access Control (MAC) and Physical Layer (PHY) Specifications—Amendment 3: Enhancements for Very High Throughput in the 60 GHz Band," Oct. 19, 2012, 628 pages.

(Continued)

*Primary Examiner* — Suhail Khan
(74) *Attorney, Agent, or Firm* — Conley Rose, P.C.

(57) ABSTRACT

A multi-band transmission method implemented by a receive end, where the method includes: receiving data packets in parallel from a transmit end using M frequency bands, where the data packets belong to a same traffic stream; receiving a BAR from the transmit end, where the BAR carries an SSN and requests a receiving state of a data packet from the transmit end on the mth frequency band; marking an mth state for an unreceived data packet whose SN is before the SSN; marking one or more unreceived data packets with a discarded state when determining the one or more unreceived data packets are marked with a first state, a second state, . . . , and an Mth state; determining whether there are data packets with consecutive SNs; and if yes, submitting a data packet that is in the received state and in the data packets with the consecutive SNs.

20 Claims, 8 Drawing Sheets

(51) Int. Cl.
*H04L 1/1607* (2023.01)
*H04L 47/34* (2022.01)
*H04W 72/0453* (2023.01)

(56) References Cited

U.S. PATENT DOCUMENTS

| | | | |
|---|---|---|---|
| 2911/9261735 | | 10/2011 | Cordeiro |
| 2012/0155511 A1* | | 6/2012 | Shaffer ............ H04B 1/7143 |
| | | | 375/E1.033 |
| 2017/0019818 A1 | | 1/2017 | Xing et al. |
| 2019/0230362 A1 | | 7/2019 | Chen et al. |

FOREIGN PATENT DOCUMENTS

| | | |
|---|---|---|
| CN | 102238640 A | 11/2011 |
| CN | 104185217 A | 12/2014 |
| WO | 2016081442 A1 | 5/2016 |
| WO | 2017168042 A1 | 10/2017 |

OTHER PUBLICATIONS

"Le TV Le Max Pro-Specifications," 2021, devicespecifications. com, URL:https://www.devicespecifications.com/en/model/566e3946, 10 pages.

Nighthawk X10 Smart WiFi Router (AD7200), "Ultimate 4K Streaming and VR Gaming," 1996-2021, Netgear , URL: https://www.netgear.com/home/wifi/routers/ad7200-fastest-router/, 6 pages.

"Talon AD7200 Multi-Band Wi-Fi Router," Copyright 2021 TP-Link Corporation Limited. All rights reserved, URL: https://www.tp-link.com/us/home-networking/wifi-router/ad7200/, 10 pages.

David Pereira, "Wi-Fi for IoT: Overcoming Connectivity Standard Fragmentation Using a Software-Defined Modem," CEVAs Experts Blog, Posted On May 4, 2016, URL:https://www.ceva-dsp.com/ourblog/wi-fi-for-iot-overcoming-connectivity-standard-fragmentation-using-a-software-defined-modem/, 4 pages.

Ericsson LM, "Introduction of Radio Frequency Colour Code," 3GPP TSG-GERAN Meeting #70 , Nanjing, China, May 23-27, 2016, GP-160485, 16 pages.

* cited by examiner

MULTI-BAND TRANSMISSION METHOD AND APPARATUS

CROSS-REFERENCE TO RELATED APPLICATIONS

This application is a continuation of International Patent Application No. PCT/CN2019/101447, filed on Aug. 19, 2019, which claims priority to Chinese Patent Application No. 201810974728.2, filed on Aug. 24, 2018. The disclosures of the aforementioned applications are hereby incorporated by reference in their entireties.

TECHNICAL FIELD

This application relates to the field of communications technologies, and in particular, to a multi-band transmission method and apparatus.

BACKGROUND

Currently, different traffic streams (TSs) may be transmitted in parallel between an access point (AP) and a station (STA) using a plurality of frequency bands. However, for one TS, because data on a plurality of frequency bands is independently transmitted, data packet disorder may occur when data packets in one TS are transmitted on a plurality of frequency bands. In the conventional technology, multi-band parallel transmission cannot be used to improve transmission efficiency of service data of some services, for example, a real-time video call and virtual reality that have a very high rate requirement.

SUMMARY

Embodiments of this application provide a multi-band transmission method and apparatus, to improve transmission efficiency of service data of a service using multi-band parallel transmission.

According to a first aspect, a multi-band transmission method is provided, including: receiving, by a receive end, data packets in parallel from a transmit end using M frequency bands, where the data packets carried in the M frequency bands belong to a same traffic stream, and M is an integer greater than 1; receiving, by the receive end, a block acknowledgment request (BAR) from the transmit end, where the BAR carries a starting sequence number (SSN), the BAR is used to request a receiving state of a data packet sent by the transmit end on the mth frequency band, and the mth frequency band is any frequency band in the M frequency bands; marking, by the receive end, an mth state for an unreceived data packet whose sequence number (SN) is before the SSN; determining, by the receive end, whether one or more unreceived data packets are marked with a first state, a second state, . . . , and an Mth state, and if yes, marking, by the receive end, the one or more unreceived data packets with a discarded state; determining, by the receive end, whether there are data packets with consecutive SNs, where any data packet in the data packets with the consecutive SNs is in a received state or a discarded state, and a data packet that is with a minimum SN and that is in the data packets with the consecutive SNs is a data packet that is with a minimum SN and that is in data packets to be processed by the receive end; and if yes, submitting, by the receive end, a data packet that is in the received state and that is in the data packets with the consecutive SNs. According to the method provided in the first aspect, when an SN of an unreceived data packet is before an SSN carried in each of M BARs (the M BARs are used to request receiving states of data packets sent by the transmit end on the M frequency bands) sent by the transmit end, it indicates that the transmit end actually discards the data packet. Therefore, the receive end may mark the data packet with a discarded state, such that all data packets processed by the receive end are data packets actually discarded by the transmit end or received by the receive end. This ensures correct processing of data packets, such that the transmit end and the receive end can transmit data packets in a same TS in parallel using a plurality of frequency bands, thereby improving transmission efficiency.

In a possible implementation, the BAR includes information about the mth frequency band. Alternatively, the BAR is sent on the mth frequency band. In the possible implementation, the transmit end may flexibly select, based on a link status (for example, a congestion level) of each frequency band, a frequency band for sending the BAR, or the transmit end negotiates with the receive end about a frequency band for sending the BAR, and the receive end also receives the BAR in the corresponding frequency band, thereby improving BAR transmission efficiency.

In a possible implementation, the receive end includes a medium access control (MAC) module and a logical link control (LLC) module, and the submitting, by the receive end, a data packet that is in the received state and that is in the data packets with the consecutive SNs includes: submitting, by the MAC module at the receive end, the data packet that is in the received state and that is in the data packets with the consecutive SNs to the LLC module at the receive end. In the possible implementation, the MAC module submits the data packets with the consecutive SNs to the LLC module, such that a success rate of unpacking by the LLC module can be ensured as much as possible.

In a possible implementation, the data packet that is with the minimum SN and that is in the data packets to be processed by the receive end is a first data packet. Additionally, when the receive end has submitted a data packet, the first data packet is a next data packet of a last data packet in data packets with consecutive SNs that are determined by the receive end last time, and a data packet submitted by the receive end last time is a data packet that is in the received state and that is in the data packets with the consecutive SNs that are determined by the receive end last time; or when the receive end has not submitted a data packet, the first data packet is a data packet whose SN is a start number of the SNs.

According to a second aspect, a multi-band transmission method is provided, including: receiving, by a receive end, data packets in parallel from a transmit end using M frequency bands, where the data packets carried in the M frequency bands belong to a same traffic stream, and M is an integer greater than 1; when the receive end receives one or more data packets, or the receive end marks one or more data packets with a discarded state, determining, by the receive end, whether there are data packets with consecutive SNs, where any data packet in the data packets with the consecutive SNs is in a received state or a discarded state, and a data packet that is with a minimum SN and that is in the data packets with the consecutive SNs is a data packet that is with a minimum SN and that is in data packets to be processed by the receive end; if yes, submitting, by the receive end, a data packet that is in the received state and that is in the data packets with the consecutive SNs; and when an SN of a data packet that is carried on the mth frequency band and that is not received by the receive end is before an SSN carried in a BAR sent by the transmit end, marking, by the receive end, the data packet with a discarded state, where the BAR is used to request a receiving state of a data packet sent by the transmit end on the mth frequency band, and the mth frequency band is any frequency band in the M frequency bands. According to the method provided in the second aspect, when an SN of an unreceived data packet carried on the mth frequency band is before an SSN carried in a BAR (the BAR is used to request a receiving state of a data packet sent by the transmit end on the mth frequency band) sent by the transmit end, it indicates that the transmit end actually discards the data packet. Therefore, the receive end may mark the data packet with a discarded state, such that all data packets processed by the receive end are data packets actually discarded by the transmit end or received by the receive end. This ensures correct processing of data packets, such that the transmit end and the receive end can transmit data packets in a same TS in parallel using a plurality of frequency bands, thereby improving transmission efficiency.

In a possible implementation, the BAR includes information about the mth frequency band. Alternatively, the BAR is sent on the mth frequency band. In the possible implementation, the transmit end may flexibly select, based on a link status (for example, a congestion level) of each frequency band, a frequency band for sending the BAR, or the transmit end negotiates with the receive end about a frequency band for sending the BAR, and the receive end also receives the BAR in the corresponding frequency band, thereby improving BAR transmission efficiency.

In a possible implementation, the receive end includes a MAC module and an LLC module, and the submitting, by the receive end, a data packet that is in the received state and that is in the data packets with the consecutive SNs includes: submitting, by the MAC module at the receive end, the data packet that is in the received state and that is in the data packets with the consecutive SNs to the LLC module at the receive end. In the possible implementation, the MAC module submits the data packets with the consecutive SNs to the LLC module, such that a success rate of unpacking by the LLC module can be ensured as much as possible.

In a possible implementation, the data packet that is with the minimum SN and that is in the data packets to be processed by the receive end is a first data packet; and when the receive end has submitted a data packet, the first data packet is a next data packet of a last data packet in data packets with consecutive SNs that are determined by the receive end last time, and a data packet submitted by the receive end last time is a data packet that is in the received state and that is in the data packets with the consecutive SNs that are determined by the receive end last time; or when the receive end has not submitted a data packet, the first data packet is a data packet whose SN is a start number of the SNs.

In a possible implementation, the method further includes: obtaining, by the receive end, information about a frequency band carrying an unreceived data packet. In the possible implementation, the receive end may determine, based on the information about the frequency band carrying the unreceived data packet, whether to mark a data packet that is not received with a discarded state.

According to a third aspect, a multi-band transmission method is provided, including: sending, by a transmit end, data packets in parallel to a receive end using M frequency bands, where the data packets carried in the M frequency bands belong to a same TS, and M is an integer greater than 1; and sending, by the transmit end, a BAR to the receive end, where the BAR is used to request a receiving state of a data packet sent by the transmit end on the mth frequency band. According to the method provided in the third aspect, the transmit end may send the data packets in the same TS to the receive end in parallel using the M frequency bands, thereby improving transmission efficiency.

In a possible implementation, the BAR includes information about the mth frequency band. Alternatively, the BAR is sent on the mth frequency band. In the possible implementation, the transmit end may flexibly select, based on a link status (for example, a congestion level) of each frequency band, a frequency band for sending the BAR, or the transmit end negotiates with the receive end about a frequency band for sending the BAR, thereby improving BAR transmission efficiency.

In a possible implementation, the method further includes: sending, by the transmit end, information about a frequency band used to carry a data packet that is not received by the receive end to the receive end. In the possible implementation, the receive end can determine the information about the frequency band carrying the unreceived data packet, and determine whether to mark a data packet that is not received with a discarded state.

According to a fourth aspect, a multi-band transmission method is provided, including: sending, by a transmit end, data packets in parallel to a receive end using M frequency bands, where the data packets carried in the M frequency bands belong to a same traffic stream, and M is an integer greater than 1; when the transmit end marks one or more data packets with a discarded state or a received state, determining, by the transmit end, a first SN, where the first SN is a previous SN of a first SSN, the first SSN is an SSN carried in a first BAR, and the first BAR is a previous BAR sent by the transmit end; determining, by the transmit end, whether at least one second SN that meets a preset condition exists, where the second SN is an SN of a data packet sent by the transmit end, and the second SN is greater than the first SSN, and where the second SN that meets the preset condition is a second SN that causes any data packet of data packets whose SNs are between the first SN and the second SN to be in a received state or a discarded state; and if yes, sending, by the transmit end, a second BAR to the receive end, where the second BAR carries a second SSN, and the second SSN is one second SN in the at least one second SN that meets the preset condition; and when determining that a quantity of retransmission times or a retransmission time of a data packet respectively exceeds a maximum quantity of retransmission times or a maximum retransmission time limit, the transmit end marks the data packet with the discarded state; or when determining that a data packet is successfully received by the receive end, the transmit end marks the data packet with the received state. According to the method provided in the fourth aspect, the transmit end sends, to the receive end, the second BAR carrying the second SSN, where all data packets before the second SSN are data packets received by the receive end or actually discarded by the transmit end, such that data packets cleared by the receive end are all data packets received by the receive end or actually discarded by the transmit end. This ensures correct processing of data packets, such that the transmit end and the receive end can transmit data packets in the same traffic stream in parallel using a plurality of frequency bands, thereby improving transmission efficiency.

In a possible implementation, the second SSN is a second SN with a maximum value in all second SNs that meet the preset condition. In the possible implementation, the transmit end can send as few BARs as possible, reducing signaling overheads between the transmit end and the receive end.

According to a fifth aspect, a multi-band transmission method is provided, where the method is applied to a transmit end, the transmit end includes a plurality of MAC modules, and the method includes: sending, by the plurality of MAC modules, data packets in parallel to a receive end using M frequency bands, where the data packets carried in the M frequency bands belong to a same traffic stream, and M is an integer greater than 1; when a first MAC module marks one or more data packets with a discarded state or a received state, determining, by the first MAC module, a first SN, where the first SN is a previous SN of a first SSN, the first SSN is an SSN carried in a first BAR, and the first BAR is a previous BAR sent by the first MAC module; determining, by the first MAC module, whether at least one second SN that meets a preset condition exists, where the second SN is an SN of a data packet sent by the plurality of MAC modules, and the second SN is greater than the first SSN; and the second SN that meets the preset condition is a second SN that causes any data packet of data packets whose SNs are between the first SN and the second SN to be in a received state or a discarded state; and if yes, sending, by the first MAC module, a second BAR to the receive end, where the second BAR carries a second SSN, and the second SSN is one second SN in the at least one second SN that meets the preset condition, where the first MAC module is any one of the plurality of MAC modules; and when determining that a quantity of retransmission times or a retransmission time of a data packet respectively exceeds a maximum quantity of retransmission times or a maximum retransmission time limit, one MAC module marks the data packet with the discarded state; or when determining that a data packet is successfully received by the receive end, one MAC module marks the data packet with the received state. According to the method provided in the fifth aspect, the transmit end sends, to the receive end, the second BAR carrying the second SSN, where all data packets before the second SSN are data packets received by the receive end or actually discarded by the transmit end, such that data packets cleared by the receive end are all data packets received by the receive end or actually discarded by the transmit end. This ensures correct processing of data packets, such that the transmit end and the receive end can transmit data packets in the same traffic stream in parallel using a plurality of frequency bands, thereby improving transmission efficiency.

In a possible implementation, the second SSN is a second SN with a maximum value in all second SNs that meet the preset condition. In the possible implementation, the transmit end can send as few BARs as possible, reducing signaling overheads between the transmit end and the receive end.

In a possible implementation, the method further includes: receiving, by the first MAC module, status information of a data packet from another MAC module in the plurality of MAC modules. In the possible implementation, by receiving the status information of the data packet sent by the other MAC module, the transmit end can more comprehensively determine a status of the data packet, to send as few BARs as possible, reducing signaling overheads between the transmit end and the receive end.

In a possible implementation, when the first MAC module marks the one or more data packets with the discarded state or the received state, the method further includes: sending, by the first MAC module, status information of the one or more data packets to the other MAC module in the plurality of MAC modules within a preset time period after marking the one or more data packets with the discarded state or the received state. In the possible implementation, the first MAC module may also send the status information of the data packets to another MAC module, such that the other MAC module determines the value of the SSN carried in the sent BAR.

According to a sixth aspect, a multi-band transmission apparatus is provided. The apparatus has a function of implementing any method provided in the first aspect or the second aspect. The function may be implemented by hardware, or may be implemented by hardware executing corresponding software. The hardware or software includes one or more units corresponding to the foregoing functions. The apparatus may exist in a product form of a chip.

According to a seventh aspect, a multi-band transmission apparatus is provided. The apparatus has a function of implementing any method provided in any one of the third aspect to the fifth aspect. The function may be implemented by hardware, or may be implemented by hardware executing corresponding software. The hardware or software includes one or more units corresponding to the foregoing functions. The apparatus may exist in a product form of a chip.

According to an eighth aspect, a multi-band transmission apparatus is provided, including a transceiver/a transceiver pin and a processor, and optionally further including a memory. The transceiver/transceiver pin, the processor, and the memory communicate with each other through an internal connection path. The processor is configured to execute an instruction to control the transceiver/transceiver pin to send or receive a signal. The memory is configured to store an instruction. When the processor executes the instruction, the processor performs the method in any one of the first aspect or the possible implementations of the first aspect, and/or the method in any one of the second aspect or the possible implementations of the second aspect. The apparatus may exist in a product form of a chip.

According to a ninth aspect, a multi-band transmission apparatus is provided, including a transceiver/a transceiver pin and a processor, and optionally further including a memory. The transceiver/transceiver pin, the processor, and the memory communicate with each other through an internal connection path. The processor is configured to execute an instruction to control the transceiver/transceiver pin to send or receive a signal. The memory is configured to store an instruction. When the processor executes the instruction, the processor performs the method in any one of the third aspect to the fifth aspect, and any one of the possible implementations of the third aspect to the fifth aspect. The apparatus may exist in a product form of a chip.

According to a tenth aspect, a computer-readable storage medium including an instruction is provided. When the instruction is run on a computer, the computer is enabled to perform any method according to any one of the first aspect to the fifth aspect.

According to an eleventh aspect, a computer program product including an instruction is provided. When the instruction is run on a computer, the computer is enabled to perform any method according to any one of the first aspect to the fifth aspect.

For technical effects brought by any design manner in the sixth aspect to the eleventh aspect, refer to the technical effects brought by corresponding design manners in the first aspect to the fifth aspect. Details are not described herein again.

DESCRIPTION OF EMBODIMENTS

The following describes technical solutions in embodiments of this application with reference to accompanying drawings in the embodiments of this application. In descriptions of this application, unless otherwise specified, "1" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. "At least one" refers to one or more, and "a plurality of" refers to two or more. Words such as "first" and "second" do not limit a quantity and an execution sequence, and words such as "first" and "second" are not necessarily different.

Figure 1:
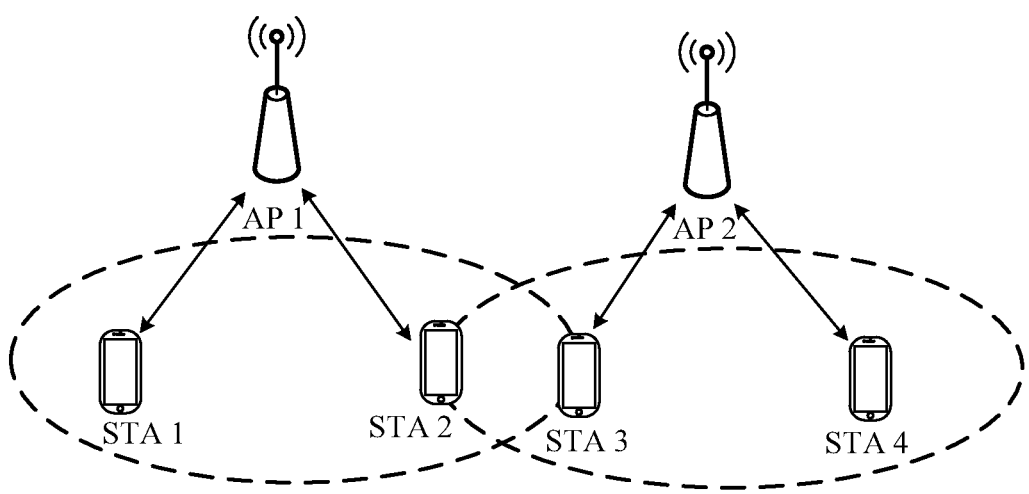
FIG. 1 is a schematic diagram of an application scenario according to an embodiment of this application.

It should be noted that the technical solutions in the embodiments of this application may be applied to a wireless local area network (WLAN). For example, the technical solutions may be applied to a WLAN scenario including a plurality of basic service sets (BSSs). Referring to FIG. 1, at least one AP is included in the scenario, and each AP and one or more STAs that communicate with the AP form one BSS. For example, an AP 1, a STA 1, and a STA 2 form one BSS, and an AP 2, a STA 3, and a STA 4 form one BSS. Each AP and each STA can work on a plurality of frequency bands. In the embodiments of this application, one of a transmit end and a receive end may be an AP, and the other may be a STA.

For more clear understanding of application of the method provided in this application in the WLAN, some content related to the embodiments of this application is first briefly described.

IEEE 802.11 protocol: The IEEE 802.11 protocol is a universal WLAN communications standard defined by the Institute of Electrical and Electronics Engineers (IEEE). Versions of the IEEE 802.11 protocol cover transmission protocols on 2.4 gigahertz (GHz), 5 GHz, 60 GHz, and 6 GHz frequency bands. In the embodiments of this application, a transmission protocol used by the transmit end and the receive end may be the IEEE 802.11 protocol.

Multi-band device: A multi-band device is a device that can work on a plurality of frequency bands. For example, a multi-band device includes a dual-band device operating at 2.4 GHz and 5 GHz, a three-band device operating at 2.4 GHz and 5 GHz, a three-band device operating at 2.4 GHz, 5 GHz, and 60 GHz, and the like. In the embodiments of this application, the transmit end and the receive end are multi-band devices.

Block acknowledgment (ACK) request (BAR) frame or block acknowledgment (BA) frame: A BAR frame is sent by a transmit end to a receive end. The BAR frame includes a starting sequence number (SSN). After receiving the BAR frame, the receive end adds information about received data packets that are received before the BAR frame and whose sequence numbers (SNs) start from the SSN to the BA frame and feeds the BA frame back to the transmit end. The transmit end determines, based on the BA frame, the data packets received by the receive end. For example, the BA frame may include a bitmap, and the receive end may place, in the bitmap, the information about the received data packets that are received before the BAR frame and whose SNs start from the SSN, and send the bitmap to the transmit end. For example, when the transmit end sends 10 data packets whose SNs are 1 to 10 to the receive end, and the SSN included in the BAR frame sent by the transmit end to the receive end is 1, if received data packets that are received by the receive end before the BAR frame and whose SNs start from 1 include data packets whose SNs are 1 to 6 and 8 to 10, the receive end adds, to the bitmap in the BA frame, information about the data packets whose SNs are 1 to 6 and 8 to 10, and sends the bitmap to the transmit end, such that the transmit end determines the data packets received by the receive end. In addition, after receiving the BAR frame, the receive end clears a data packet whose SN is before the SSN (submits the data packet whose SN is before the SSN and that has been received to an upper-layer protocol layer for processing).

It should be noted that, if the transmit end determines, based on the BA frame, that a data packet is not received by the receive end, the transmit end retransmits the data packet. When a quantity of retransmission times or a retransmission time of a data packet respectively exceeds a maximum quantity of retransmission times or a maximum retransmission time limit, the transmit end discards the data packet. Only after the transmit end discards one data packet, the SSN in the sent BAR frame may be greater than an SN of the data packet. In other words, only after the transmit end discards one data packet, the receive end clears the data packet.

It should be noted that data packets in different TSs are numbered using different sets of SNs, and data packets in a same TS are numbered using one set of SNs. For example, if one TS includes 10 data packets, numbers of the 10 data packets may be 1 to 10. To improve transmission efficiency, data packets in a same TS may be transmitted between a transmit end and a receive end using a plurality of frequency bands. However, the following problems exist.

Figure 2:
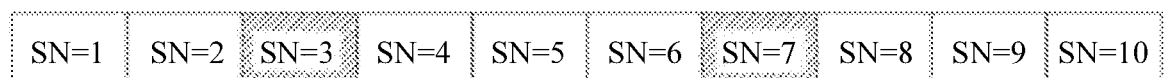
FIG. 2 is a schematic diagram of sending a data packet on a plurality of frequency bands according to an embodiment of this application.

Referring to FIG. 2, if one TS includes 10 data packets, SNs of the 10 data packets are 1 to 10, data packets whose SNs are 1 to 4 are sent on a frequency band 1, and data packets whose SNs are 5 to 10 are sent on a frequency band 2. The receive end receives data packets from the two frequency bands, and stores the data packets received from the two frequency bands in a unified reordering buffer. After sending data packets, the transmit end sends BAR frames to the receive end. BAR frames sent on different frequency bands do not affect each other.

On the frequency band 1, after sending the data packets whose SNs are 1 to 4, the transmit end may send a BAR 1 to the receive end, where an SSN in the BAR 1 is 1. After receiving the BAR 1, the receive end feeds back, to the transmit end, information about received data packets that are received before the BAR 1 and whose SNs start from 1. Referring to FIG. 2, if a data packet whose SN is 3 is not received by the receive end, the receive end feeds back information about data packets whose SNs are 1, 2 and 4 to the transmit end.

On the frequency band 2, after sending the data packets whose SNs are 5 to 10, the transmit end may send a BAR 2 to the receive end, where an SSN in the BAR 2 is 5. After receiving the BAR 2, the receive end feeds back, to the transmit end, information about received data packets that are received before the BAR 2 and whose SNs start from 5. Referring to FIG. 2, if a data packet whose SN is 7 is not received by the receive end, the receive end feeds back information about data packets whose SNs are 5, 6, 8, 9 and 10 to the transmit end, and clears a data packet whose SN is less than 5.

Because congestion statuses of transmission paths of the two frequency bands are different, the receive end may first receive the BAR 2, and then receive the BAR 1. If the receive end first receives the BAR 2, the receive end clears the data packet whose SN is less than 5. However, after determining that the data packet whose SN is 3 is not received by the receive end, the transmit end may further perform a retransmission operation, such that the receive end may correctly receive the data packet. It can be learned that, if the receive end clears the data packet whose SN is less than 5 after receiving the BAR 2, a data packet processing error may occur.

Figure 3:
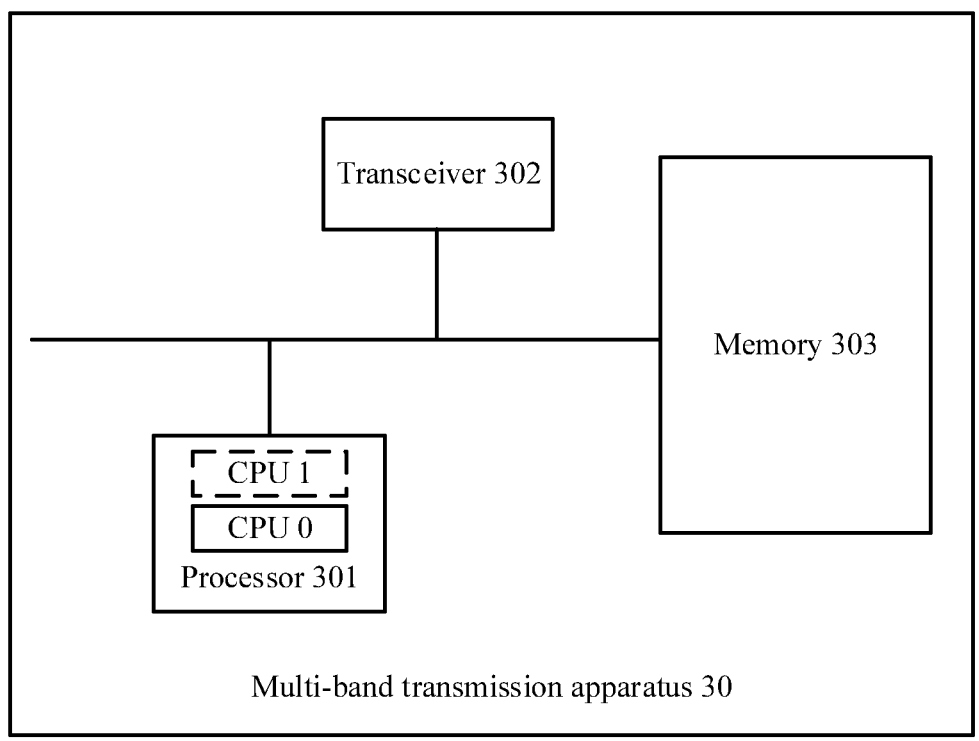
FIG. 3 is a schematic structural diagram of hardware of a multi-band transmission apparatus according to an embodiment of this application.

To resolve this problem and improve transmission efficiency, an embodiment of this application provides a schematic diagram of a hardware structure of a multi-band transmission apparatus 30. As shown in FIG. 3, the multi-band transmission apparatus 30 may be a transmit end or a receive end described below. The multi-band transmission apparatus 30 includes at least one processor 301 and at least one transceiver 302, and may further include a memory 303. FIG. 3 is drawn using an example in which the multi-band transmission apparatus 30 includes one processor 301, a memory 303, and one transceiver 302. The transceiver in this embodiment of this application may also be replaced with a transceiver pin.

The transceiver 302, the processor 301, and the memory 303 communicate with each other through an internal connection path. The processor 301 is configured to execute an instruction to control the transceiver 302 to send or receive a signal. The memory 303 is configured to store an instruction. When executing the instruction, the processor 301 performs the method described below.

The processor 301 may be one or more general-purpose central processors (e.g., a central processing unit (CPU)), microprocessors, or application-specific integrated circuits (ASICs), or one or more integrated circuits configured to control program execution of the solutions in this application. The processor 301 may be a single-core processor, or may be a multi-core processor. The processor herein may be one or more devices, circuits, and/or processing cores for processing data (such as a computer program instruction). In an embodiment, the processor 301 may include one or more CPUs, for example, a CPU 0 and a CPU 1 in FIG. 3.

The transceiver 302 is configured to communicate with another device or a communications network.

The memory 303 is configured to store a computer-executable instruction for executing the solutions in this application, and the processor 301 controls the execution. The processor 301 is configured to execute the computer-executable instruction stored in the memory 303, to perform a method provided in the following embodiments of this application, for example, to perform an action of a transmit end or a receive end described below. The memory 303 may be a read-only memory (ROM) or another type of static storage device capable of storing static information and instructions, a random-access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto.

Optionally, an instruction executed by a computer in this embodiment of this application may also be referred to as application program code. This is not specifically limited in this embodiment of this application.

Figure 4:
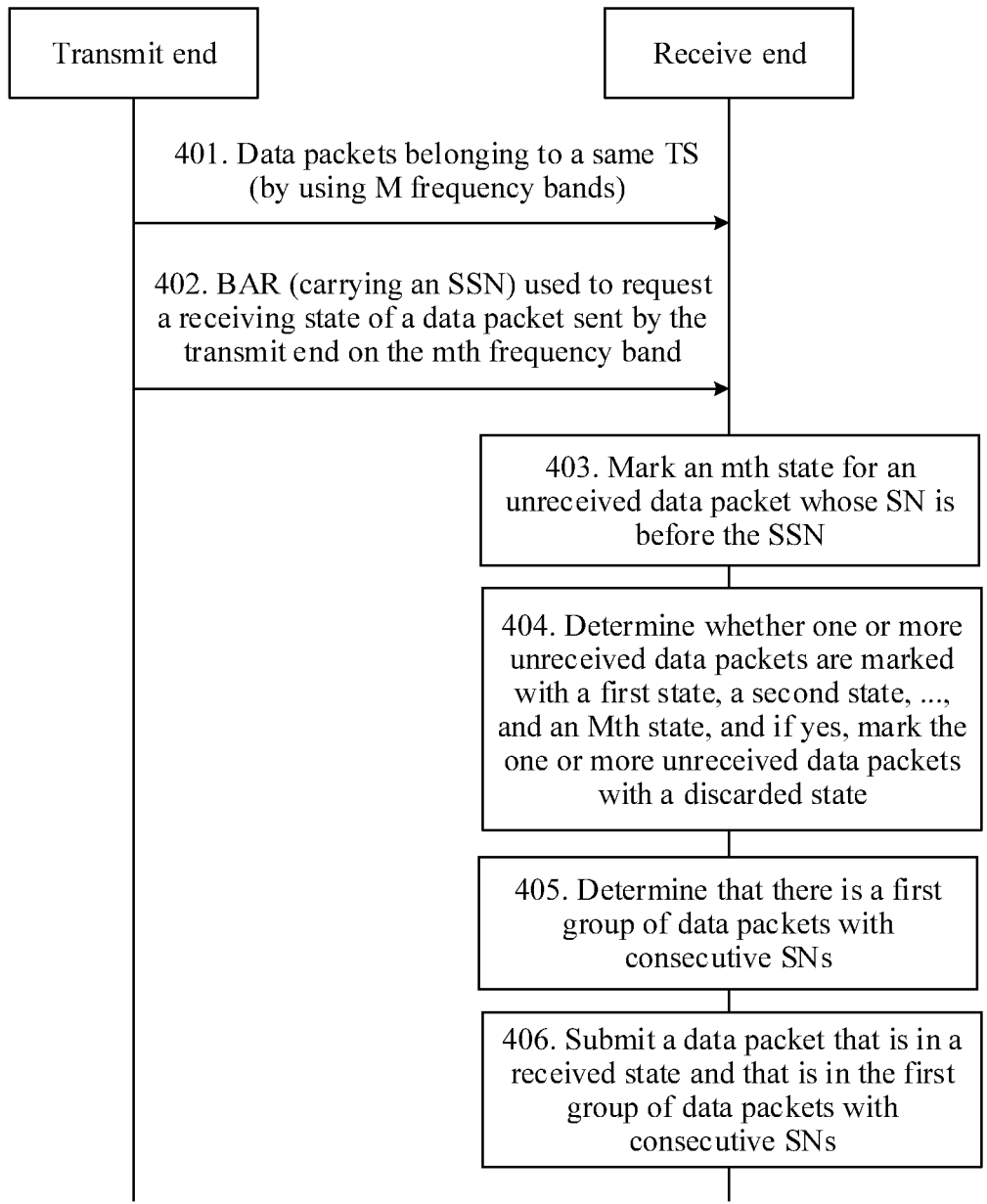
FIG. 4 is a flowchart of a multi-band transmission method according to an embodiment of this application.

An embodiment of this application provides a multi-band transmission method. As shown in FIG. 4, the method includes the following steps.

401. A transmit end sends data packets in parallel to a receive end using M frequency bands, where the data packets carried in the M frequency bands belong to a same TS, and M is an integer greater than 1. Correspondingly, the receive end receives the data packets in parallel from the transmit end using the M frequency bands.

The data packet in this embodiment of this application may be a media access control (MAC) protocol data unit (MPDU). The data packets belonging to the same TS are numbered using one set of SNs.

Both the transmit end and the receive end can work on the M frequency bands. One transmission queue may be corresponding to one frequency band, and data packets in one transmission queue are transmitted using a frequency band corresponding to the transmission queue.

The data packets transmitted on the M frequency bands may be the same data packets in the same TS. In this case, transmission reliability of the data packets can be improved. For example, if one TS includes 10 data packets, all data packets transmitted on the M frequency bands are the 10 data packets. 10*M data packets are transmitted on the M frequency bands in total, and the 10*M data packets are numbered using one set of SNs. For example, SNs of the 10*M data packets may be 1, 2, . . . , 10*M−1, and 10*M. It should be noted that any number may be used as a start number for the SNs of the data packets. For example, the start number may be 0. The method provided in this embodiment of this application is described in this application using an example in which the start number is 1.

The data packets transmitted on the M frequency bands may also be different data packets in the same TS. In this case, transmission efficiency of the data packets can be improved. For example, one TS includes 20 data packets. If M is 2, 10 of the 20 data packets may be transmitted on one frequency band of the two frequency bands, and the other 10 of the 20 data packets may be transmitted on the other frequency band. The 20 data packets are numbered using one set of SNs, for example, SNs of the 20 data packets may be 1, 2, 3, . . . , 19, and 20.

Figure 5:
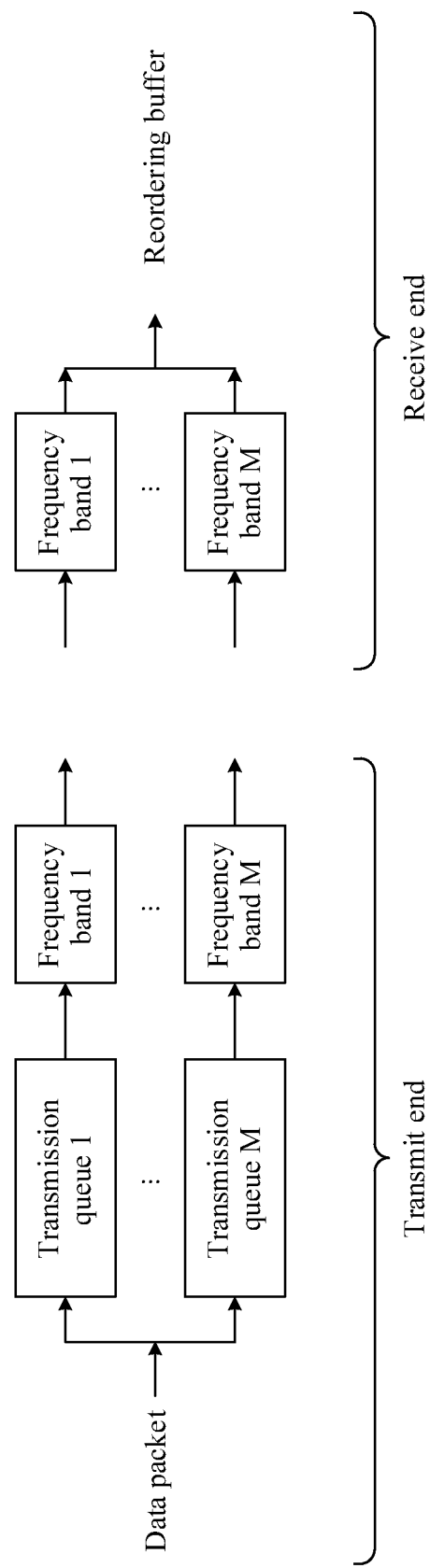
FIG. 5 is a schematic diagram of multi-band transmission between a transmit end and a receive end according to an embodiment of this application.

For example, as shown in FIG. 5, the transmit end allocates data packets that are numbered using one set of SNs and that belong to a same TS to M transmission queues, and sends, in parallel using M frequency bands, the data packets in the M transmission queues to the receive end, and data packets in transmission queues corresponding to the M frequency bands are separately transmitted independently according to a channel contention protocol of the M frequency bands. Correspondingly, the receive end separately receives the data packets in parallel from the transmit end on the M frequency bands, and the data packets received using the M frequency bands are stored in a unified reordering buffer. It should be noted that a data packet on the transmit side in FIG. 5 may be a newly transmitted data packet, or may be a retransmitted data packet.

402. The transmit end sends a BAR to the receive end. Correspondingly, the receive end receives the BAR from the transmit end.

The BAR carries an SSN, and the BAR is used to request a receiving state of a data packet sent by the transmit end on the mth frequency band. For example, the BAR is used to request a receiving state of a data packet that the transmit end sends on the mth frequency band and whose SN starts from the SSN. The mth frequency band is any one of the M frequency bands.

The BAR includes information about the mth frequency band. Alternatively, the BAR is sent on the mth frequency band. In other words, in a possible implementation, when the transmit end sends the BAR on the mth frequency band, the BAR is a BAR used to request the receiving state of the data packet sent by the transmit end on the mth frequency band. In another possible implementation, when the BAR includes information about the mth frequency band, the BAR is a BAR used to request the receiving state of the data packet sent by the transmit end on the mth frequency band.

It should be noted that each time the receive end receives a BAR, the receive end may perform the following steps 403 to 406.

403. The receive end marks an mth state for an unreceived data packet whose SN is before the SSN.

For example (referred to as example 1 below), based on the example shown in FIG. 2, when the receive end receives a BAR used to request a receiving state of a data packet sent by the transmit end on the first frequency band (a frequency band 1), if SSN is 4 in the BAR, the receive end marks a data packet whose SN is 3 with a first state. When the receive end further receives a BAR that is used to request a receiving state of a data packet sent by the transmit end on the second frequency band (a frequency band 2), if SSN is 10 in the BAR, the receive end marks both a data packet whose SN is 3 and a data packet whose SN is 7 with a second state.

The mth state may also be denoted as Ready_to_flush_band_m.

It should be noted that, in all the embodiments of this application, a data packet that is not received and a data packet that is partially received are considered as unreceived data packets.

404. The receive end determines whether one or more unreceived data packets are marked with the first state, the second state, . . . , and an Mth state. If yes, the receive end marks the one or more unreceived data packets with a discarded state.

It may be understood that, if M is 2, when a data packet is marked with the first state and the second state, the data packet may be marked with the discarded state. For example (referred to as example 2 below), based on example 1, because the data packet whose SN is 3 is marked with both the first state and the second state, the receive end may mark the data packet whose SN is 3 with the discard state, and mark a data packet whose SN is 7 only with the second state, not with the first state. Therefore, the data packet whose SN is 7 cannot be marked with the discarded state.

The discarded state may also be denoted as Ready_to_flush.

405. The receive end determines whether there are data packets with consecutive SNs (denoted as the first group of data packets with consecutive SNs).

If yes, step 406 is performed. If no, step 406 is not performed; when receiving a next BAR, the receive end may continue to perform step 403 and subsequent steps. FIG. 4 is drawn using an example in which the receive end determines that there is the first group of data packets with consecutive SNs.

Any data packet in the first group of data packets with consecutive SNs is in a received state or the discarded state, and a data packet that is with a minimum SN and that is in the first group of data packets with consecutive SNs is a data packet that is with a minimum SN and that is in data packets to be processed by the receive end.

When the receive end has not submitted a data packet, the data packets to be processed by the receive end are all data packets. When the receive end has submitted a data packet, the data packets to be processed by the receive end are all data packets after a last data packet in data packets with consecutive SNs that are determined by the receive end last time.

Optionally, the data packet that is with the minimum SN and that is in the data packets to be processed by the receive end is a first data packet; and when the receive end has submitted a data packet, the first data packet is a next data packet of a last data packet in data packets with consecutive SNs that are determined by the receive end last time (denoted as the second group of data packets with consecutive SNs), and a data packet submitted by the receive end last time is a data packet that is in the received state and that is in the second group of the data packets with the consecutive SNs; or when the receive end has not submitted a data packet, the first data packet is a data packet whose SN is a start number of the SNs.

A group of data packets with consecutive SNs is a group of data packets in which each data packet is in the received state or the discarded state and that have consecutive SNs. For example, based on example 2, data packets whose SNs are 1, 2, . . . , and 6 are a group of consecutive data packets, and data packets whose SNs are 1, 2, 3, and 4 are also a group of consecutive data packets.

For example, when the receive end has not submitted any data packet, the first data packet is a data packet whose SN is 1. When the receive end has submitted a data packet, if the second group of consecutive data packets are data packets whose SNs are 1, 2, 3, and 4, the first data packet is a data packet whose SN is 5.

406. The receive end submits a data packet that is in the received state and that is in the first group of data packets with consecutive SNs.

It should be noted that the first group of data packets with consecutive SNs are preferably the first group of all data packets with consecutive SNs. In other words, a next data packet of a last data packet in the first group of data packets with consecutive SNs is neither in the received state nor in the discarded state. For example, based on example 2, if data packets whose SNs are 1, 2, . . . , and 6 may be the first group of consecutive data packets, and data packets whose SNs are 1, 2, 3, and 4 may also be the first group of consecutive data packets, then the data packet submitted by the receive end may preferably be a data packet that is in the data packets whose SNs are 1, 2, . . . , and 6 and that is in the received state, such that times for which the receive end submits a data packet can be reduced, and processing efficiency of data packets can be improved.

Figure 6:
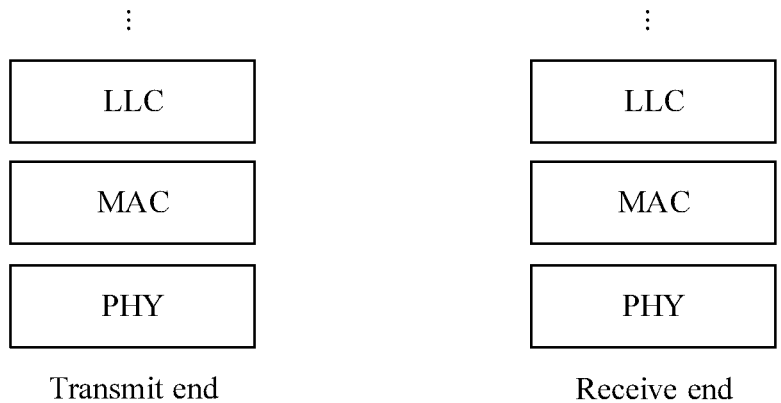
FIG. 6 is an architectural diagram of a protocol stack of a transmit end and a receive end according to an embodiment of this application.

For example, if protocol stack architectures of a transmit end and a receive end are those shown in FIG. 6, there is a physical (PHY) layer below a MAC layer of the transmit end and the receive end, and there is a logical link control (LLC) layer above the MAC layer. Optionally, the receive end includes a MAC module and an LLC module. In actual implementation, step 406 may include: The MAC module at the receive end submits the data packet that is in the received state and that is in the first group of data packets with consecutive SNs to the LLC module at the receive end. In this case, all actions of the receive end in this embodiment may be performed by the MAC layer of the receive end. It should be noted that the MAC module in this embodiment of this application may also be referred to as a MAC entity, and the LLC module may also be referred to as an LLC entity.

It should be noted that in the foregoing embodiment, each time the receive end receives one or more data packets, steps 405 and 406 may also be performed.

According to the method provided in this embodiment of this application, when an SN of an unreceived data packet is before an SSN carried in each of M BARs (the M BARs are used to request receiving states of data packets sent by the transmit end on the M frequency bands) sent by the transmit end, it indicates that the transmit end actually discards the data packet. Therefore, the receive end may mark the data packet with the discarded state, such that all data packets processed by the receive end are data packets actually discarded by the transmit end or received by the receive end. This ensures correct processing of data packets, such that the transmit end and the receive end can transmit data packets in a same TS in parallel using a plurality of frequency bands, thereby improving transmission efficiency.

Figure 7:
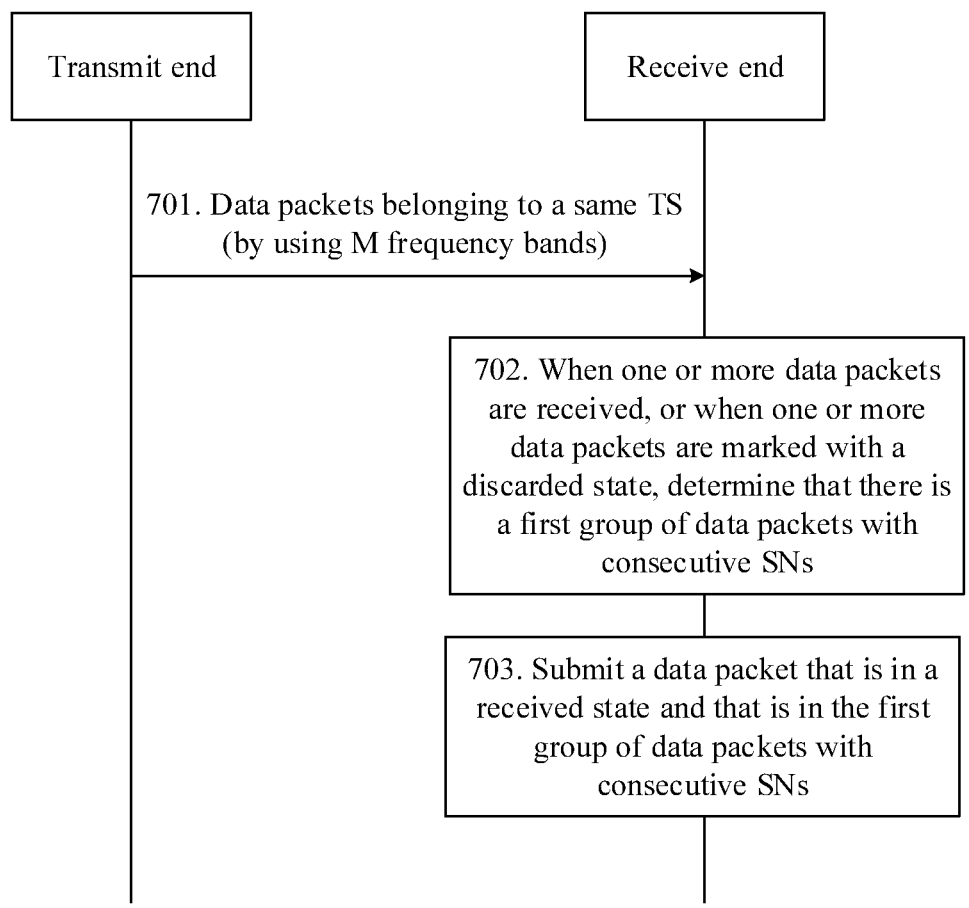
FIG. 7 is a flowchart of another multi-band transmission method according to an embodiment of this application.

An embodiment of this application further provides a multi-band transmission method. As shown in FIG. 7, the method includes the following steps.

701. A transmit end sends data packets in parallel to a receive end using M frequency bands, where the data packets carried in the M frequency bands belong to a same TS, and M is an integer greater than 1. Correspondingly, the receive end receives the data packets in parallel from the transmit end using the M frequency bands.

For related descriptions of step 701, refer to the foregoing step 401. Details are not described herein again.

702. When the receive end receives one or more data packets, or the receive end marks one or more data packets with a discarded state, the receive end determines whether there are data packets with consecutive SNs (denoted as the first group of data packets with consecutive SNs).

If yes, step 703 is performed. If no, step 703 is not performed; when receiving a next data packet or marking one or more data packets with the discarded state again, the receive end continues to determine whether there is the first group of data packets with consecutive SNs. FIG. 7 is drawn using an example in which the receive end determines that there is the first group of data packets with consecutive SNs.

When an SN of a data packet that is carried on the mth frequency band and that is not received by the receive end is before an SSN carried in a BAR sent by the transmit end, the receive end marks the data packet with the discarded state, where the BAR is used to request a receiving state of a data packet sent by the transmit end on the mth frequency band, and the mth frequency band is any frequency band in the M frequency bands.

Optionally, before the receive end marks one or more data packets with the discarded state, the method further includes: The receive end obtains information about a frequency band carrying an unreceived data packet. For example, the transmit end may send, to the receive end, information about a frequency band used to carry a data packet that is not received by the receive end. Then the receive end receives, from the transmit end, the information about the frequency band carrying the data packet that is not received.

For example, in a possible implementation, the transmit end may include a bitmap in the sent BAR. The bitmap includes a correspondence between a data packet that is not received by the receive end and information about a frequency band carrying a data packet that is not received by the receive end. After the receive end receives the BAR, the information about the frequency band carrying the data packet that is not received by the receive end may be determined based on the correspondence.

Optionally, the method further includes: The transmit end sends a BAR to the receive end, where the BAR is used to request a receiving state of a data packet sent by the transmit end on the mth frequency band. Correspondingly, the receive end receives the BAR from the transmit end. The receive end may determine, based on the received BAR and the obtained information about the frequency band carrying the unreceived data packet, whether to mark some data packets with the discarded state.

Optionally, the BAR includes information about the mth frequency band. Alternatively, the BAR is sent on the mth frequency band. For related descriptions of the optional method, refer to the foregoing descriptions. Details are not described herein again.

For example, based on the example shown in FIG. 2, when the receive end receives the BAR used to request a receiving state of a data packet sent by the transmit end on the second frequency band (a frequency band 2), if SSN is 10 in the BAR, the receive end marks a data packet whose SN is 7 with the discarded state, but does not mark a data packet whose SN is 3 with the discarded state, because the data packet whose SN is 3 is not a data packet carried on the second frequency band. When the receive end receives the BAR that is used to request a receiving state of a data packet sent by the transmit end on the first frequency band (a frequency band 1), if SSN is 4 in the BAR, the receive end marks a data packet whose SN is 3 with the discarded state.

The discarded state may also be denoted as Ready_to_flush.

Any data packet in the first group of data packets with consecutive SNs is in a received state or the discarded state, and a data packet that is with a minimum SN and that is in the first group of data packets with consecutive SNs is a data packet that is with a minimum SN and that is in data packets to be processed by the receive end. Optionally, the data packet that is with the minimum SN and that is in the data packets to be processed by the receive end is a first data packet. Additionally, when the receive end has submitted a data packet, the first data packet is a next data packet of a last data packet in data packets with consecutive SNs that are determined by the receive end last time (denoted as the second group of data packets with consecutive SNs), and a data packet submitted by the receive end last time is a data packet that is in the received state and that is in the second group of the data packets with the consecutive SNs; or when the receive end has not submitted a data packet, the first data packet is a data packet whose SN is a start number of the SNs. For related descriptions of the optional method, refer to the foregoing descriptions. Details are not described herein again.

For a process in which the receive end determines whether there is the first group of data packets with consecutive SNs, refer to the foregoing step 406. Details are not described herein again.

703. The receive end submits a data packet that is in the received state and that is in the first group of data packets with consecutive SNs.

Optionally, the receive end includes a MAC module and an LLC module. In actual implementation, step 703 may include: The MAC module at the receive end submits the data packet that is in the received state and that is in the first group of data packets with consecutive SNs to the LLC module at the receive end. In this case, all actions of the receive end in this embodiment may be performed by the MAC layer of the receive end.

According to the method provided in this embodiment of this application, when an SN of an unreceived data packet carried on the mth frequency band is before an SSN carried in a BAR (the BAR is used to request a receiving state of a data packet sent by the transmit end on the mth frequency band) sent by the transmit end, it indicates that the transmit end actually discards the data packet. Therefore, the receive end may mark the data packet with the discarded state, such that all data packets processed by the receive end are data packets actually discarded by the transmit end or received by the receive end. This ensures correct processing of data packets, such that the transmit end and the receive end can transmit data packets in a same TS in parallel using a plurality of frequency bands, thereby improving transmission efficiency.

Figure 8:
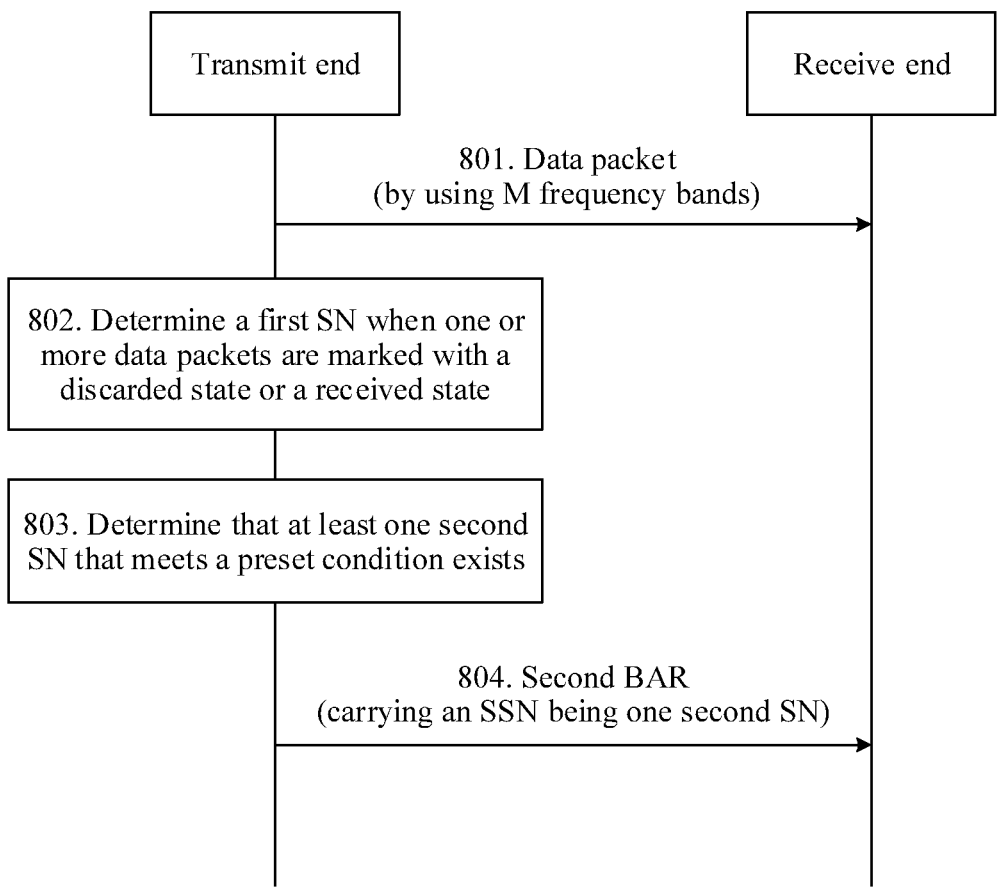
FIG. 8 is a flowchart of another multi-band transmission method according to an embodiment of this application.

An embodiment of this application further provides a multi-band transmission method. As shown in FIG. 8, the method includes the following steps.

801. A transmit end sends data packets in parallel to a receive end using M frequency bands, where the data packets carried in the M frequency bands belong to a same TS, and M is an integer greater than 1. Correspondingly, the receive end receives the data packets in parallel from the transmit end using the M frequency bands.

For related descriptions of step 801, refer to the foregoing step 401. Details are not described herein again.

802. When the transmit end marks one or more data packets with a discarded state or a received state, the transmit end determines a first SN, where the first SN is a previous SN of a first SSN, the first SSN is an SSN carried in a first BAR, and the first BAR is a previous BAR sent by the transmit end.

When determining that a quantity of retransmission times or a retransmission time of a data packet respectively exceeds a maximum quantity of retransmission times or a maximum retransmission time limit, the transmit end marks the data packet with the discarded state; or when determining that a data packet is successfully received by the receive end, the transmit end marks the data packet with the received state. For example, if a maximum quantity of the retransmission times is five, and a data packet is not successfully retransmitted for five times, the transmit end may mark the data packet with the discarded state; or if retransmission succeeds, the transmit end may mark the data packet with the received state.

For example, the transmit end may maintain a state for each sent data packet, and the maintained state includes: (1) Unknown state: an initial state marked by the transmit end for a data packet after the data packet is sent; (2) Received state: a state marked by the transmit end for a data packet after the transmit end determines that the data packet is successfully received by the receive end; (3) Discarded state: a state marked by the transmit end for a data packet when a quantity of retransmission times or a retransmission time of the data packet respectively exceeds the maximum quantity of retransmission times or the maximum retransmission time limit.

That the transmit end marks a plurality of data packets with the discarded state or the received state means that the transmit end marks any one of the plurality of data packets with the discarded state or the received state. In other words, some of the plurality of data packets may be marked with the discarded state, and some of the data packets may be marked with the received state.

For example, if an SSN carried in the previous BAR sent by the transmit end is 3, the first SN is 2.

The discarded state may also be denoted as Ready_to_flush.

S803. The transmit end determines whether at least one second SN that meets a preset condition exists, where the second SN is an SN of a data packet sent by the transmit end, and the second SN is greater than the first SSN; and the second SN that meets the preset condition is a second SN that causes any data packet of data packets whose SNs are between the first SN and the second SN to be in the received state or the discarded state.

If yes, step 804 is performed. If no, step 804 is not performed; when marking one or more data packets with the discarded state or received state next time, the receive end continues to determine the first SN and perform step 803 and subsequent steps. FIG. 8 is drawn using an example in which the transmit end determines that the at least one second SN that meets the preset condition exists.

In actual implementation of step 803, the transmit end may determine, in ascending order of SNs, whether the at least one second SN that meets the preset condition exists, or may determine, in descending order of SNs, whether the at least one second SN that meets the preset condition exists. This is not specifically limited in this embodiment of this application.

It should be noted that there may be a plurality of second SNs that meet the preset condition. For example (referred to as example 3 below), based on the example shown in FIG. 2, when both data packets whose SNs are 3 and 7 are data packets that are not received by the receive end, the data packet whose SN is 3 is marked with the discarded state by the transmit end, and the data packet whose SN is 7 is not marked with the discarded state. If the first SN is 2, the second SN may be 4, 5, 6, and 7.

S804. The transmit end sends a second BAR to the receive end, where the second BAR carries a second SSN, and the second SSN is one second SN in the at least one second SN that meets the preset condition. Correspondingly, the receive end receives the second BAR from the transmit end.

Optionally, the second SSN is a second SN with a maximum value in all second SNs that meet the preset condition. For example, based on example 3, the second SN with the maximum value in the second SNs that meet the preset condition is 7. In this optional method, the transmit end can send as few BARs as possible, reducing signaling overheads between the transmit end and the receive end.

The foregoing steps 801 to 804 describe how the transmit end sends the second BAR and subsequent BARs. If the transmit end sends the first BAR, after step 801 is performed, when marking one or more data packets with the discarded state or the received state, the transmit end determines, starting from a sent data packet with a minimum SN, whether there are data packets with consecutive SNs. If there are data packets with consecutive SNs, the transmit end sends the BAR to the receive end. An SSN carried in the BAR is an SN of any data packet other than the first data packet in all data packets with consecutive SNs, or an SN of a next data packet of a data packet with a maximum SN in all data packets with consecutive SNs. Preferably, the SSN carried in the BAR is the SN of the next data packet of the data packet with the maximum SN in all the data packets with the consecutive SNs. Any data packet in the data packets with the consecutive SNs is in the discarded state or the received state.

For example, based on the example shown in FIG. 2, the transmit end sends data packets whose SNs are 1 to 10 to the receive end using the frequency band 1 and the frequency band 2. If the transmit end marks a data packet whose SN is 3 with the discarded state, data packets whose SNs are 1, 2, 4, 5 and 6 are marked with the received state, then the transmit end determines, starting from the data packet whose SN is 1, whether data packets with consecutive SNs exist. Because the data packets whose SNs are 1 to 6 are all the data packets with the consecutive SNs, the transmit end may send a BAR to the receive end, and an SSN in the BAR may be 2, 3, 4, 5, 6, or 7. Preferably, the SSN is 7.

According to the method provided in the embodiment of this application, the transmit end sends, to the receive end, the second BAR carrying the second SSN, where all data packets before the second SSN are data packets received by the receive end or actually discarded by the transmit end, such that the receive end clears all data packets received by the receive end or actually discarded by the transmit end. This ensures correct processing of data packets, such that the transmit end and the receive end can transmit data packets in the same TS in parallel using a plurality of frequency bands, thereby improving transmission efficiency.

Figure 9:
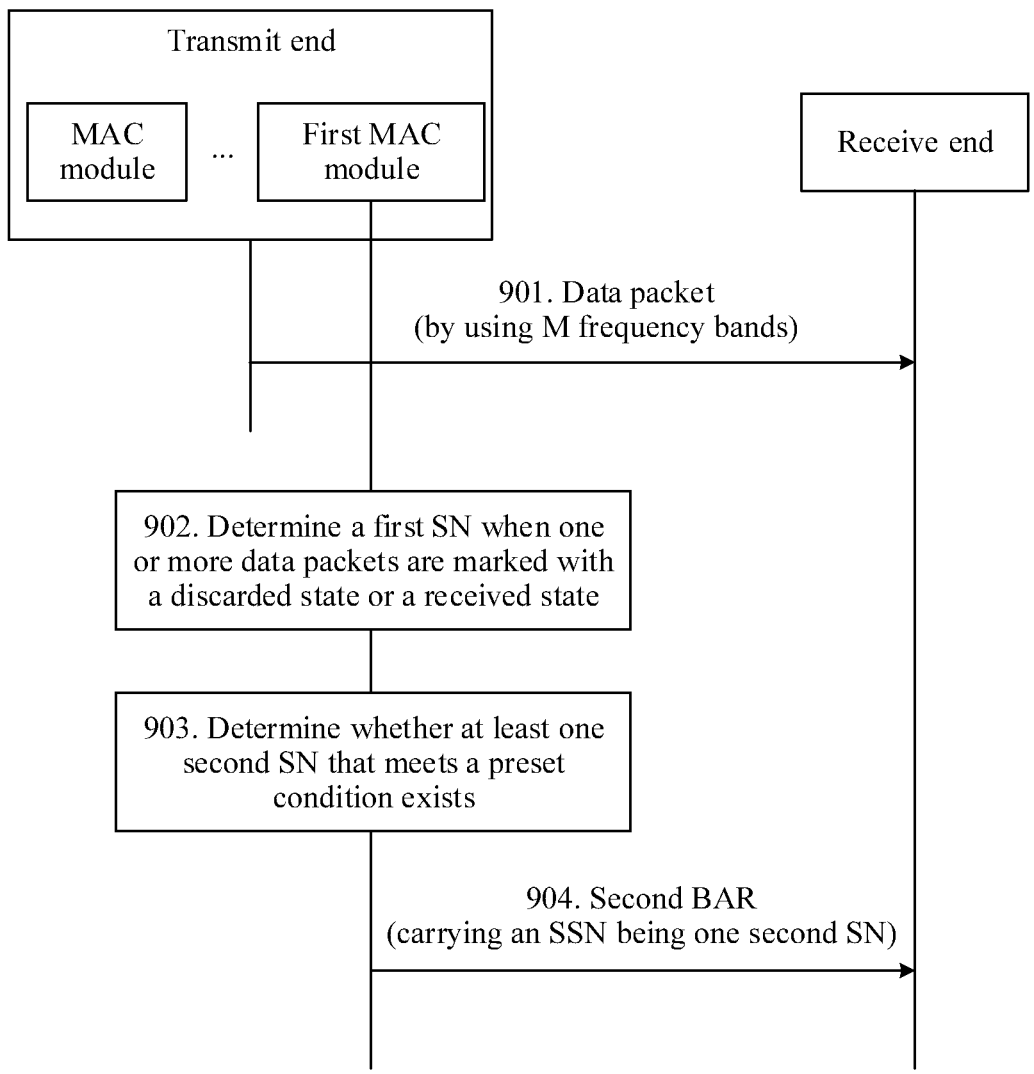
FIG. 9 is a flowchart of another multi-band transmission method according to an embodiment of this application.

An embodiment of this application further provides a multi-band transmission method, where the method is applied to a transmit end and the transmit end includes a plurality of MAC modules. As shown in FIG. 9, the method includes the following steps.

901. The plurality of MAC modules send data packets in parallel to a receive end using M frequency bands, where the data packets carried in the M frequency bands belong to a same TS, and M is an integer greater than 1. Correspondingly, the receive end receives the data packets in parallel from the transmit end using the M frequency bands.

For related descriptions of step 901, refer to the foregoing step 401. An only difference is that the step herein is performed by the plurality of MAC modules at the transmit end.

902. When a first MAC module marks one or more data packets with a discarded state or a received state, the first MAC module determines a first SN, where the first SN is a previous SN of a first SSN, the first SSN is an SSN carried in a first BAR, and the first BAR is a previous BAR sent by the first MAC module.

The first MAC module is any one of the plurality of MAC modules; and when determining that a quantity of retransmission times or a retransmission time of a data packet respectively exceeds a maximum quantity of retransmission times or a maximum retransmission time limit, one MAC module marks the data packet with the discarded state; or when determining that a data packet is successfully received by the receive end, one MAC module marks the data packet with the received state.

The discarded state may also be denoted as Ready_to_flush.

903. The first MAC module determines whether at least one second SN that meets a preset condition exists, where the second SN is an SN of a data packet sent by the plurality of MAC modules, and the second SN is greater than the first SSN; and the second SN that meets the preset condition is a second SN that causes any data packet of data packets whose SNs are between the first SN and the second SN to be in the received state or the discarded state.

If yes, step 904 is performed. If no, step 904 is not performed; when marking one or more data packets with the discarded state or received state next time, the first MAC module continues to determine the first SN and perform step 903 and subsequent steps. FIG. 9 is drawn using an example in which the first MAC module determines that the at least one second SN that meets the preset condition exists.

904. The first MAC module sends a second BAR to the receive end, where the second BAR carries a second SSN, and the second SSN is one second SN in the at least one second SN that meets the preset condition. Correspondingly, the receive end receives the second BAR from the transmit end.

For related descriptions of steps 902 to 904, refer to the foregoing steps 802 to 804. An only difference is that the steps herein are performed by the first MAC module at the transmit end.

Optionally, the second SSN is a second SN with a maximum value in all second SNs that meet the preset condition. For related descriptions of the optional step, refer to the embodiment shown in FIG. 8. Details are not described herein again.

Optionally, the method further includes: The first MAC module receives status information of a data packet from another MAC module in the plurality of MAC modules. The status information of the data packet may be information that the data packet is in the received state or the discarded state. By receiving the status information of the data packet sent by the other MAC module, the transmit end can more comprehensively determine on a status of the data packet, to send as few BARs as possible, reducing signaling overheads between the transmit end and the receive end.

Optionally, when the first MAC module marks the one or more data packets with the discarded or received state, the method further includes: The first MAC module sends status information of the one or more data packets to the other MAC module in the plurality of MAC modules within a preset time period after marking the one or more data packets with the discarded state or the received state. The first MAC module may also send the status information of the one or more data packets to another MAC module, such that the other MAC module determines a value of an SSN carried in the sent BAR. The preset time period may be set based on an actual application scenario. For example, the preset time period may be 20 ms.

The foregoing steps 901 to 904 describe how the first MAC module sends the second BAR and subsequent BARs. If the first MAC module sends the first BAR, after step 901 is performed, when marking one or more data packets with the discarded state or the received state, the first MAC module determines, starting from a data packet with a minimum SN in the data packets sent by the plurality of MAC modules, whether there are data packets with consecutive SNs. If there are data packets with consecutive SNs, the first MAC module sends the BAR to the receive end. An SSN carried in the BAR is an SN of any data packet other than the first data packet in all data packets with consecutive SNs, or an SN of a next data packet of a data packet with a maximum SN in all data packets with consecutive SNs. Preferably, the SSN carried in the BAR is the SN of the next data packet of the data packet with the maximum SN in all the data packets with the consecutive SNs. Any data packet in the data packets with the consecutive SNs is in the discarded state or the received state.

For example, based on the example shown in FIG. 2, the plurality of MAC modules send data packets whose SNs are 1 to 10 to the receive end using the frequency band 1 and the frequency band 2. If the first MAC module marks a data packet whose SN is 3 with the discarded state, data packets whose SNs are 1, 2 and 4 are marked with the received state, and receives information that data packets whose SNs are 5 and 6 are in the received state from another MAC module, then the first MAC module determines, starting from the data packet whose SN is 1, whether data packets with consecutive SNs exist. Because the data packets whose SNs are 1 to 6 are all the data packets with the consecutive SNs, the first MAC module may send a BAR to the receive end, and an SSN in the BAR may be 2, 3, 4, 5, 6, or 7. Preferably, the SSN is 7.

According to the method provided in the embodiment of this application, the transmit end sends, to the receive end, the second BAR carrying the second SSN, where all data packets before the second SSN are data packets received by the receive end or actually discarded by the transmit end, such that the receive end clears all data packets received by the receive end or actually discarded by the transmit end. This ensures correct processing of data packets, such that the transmit end and the receive end can transmit data packets in the same TS in parallel using a plurality of frequency bands, thereby improving transmission efficiency.

The foregoing mainly describes the solutions of the embodiments of this application from a perspective of a method. It may be understood that, to implement the foregoing functions, the multi-band transmission apparatus includes a corresponding hardware structure and/or software module for performing each function. A person skilled in the art should be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into functional units of the multi-band transmission apparatus may be based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in this embodiment of this application, division into units is an example, and is merely a logical function division. In actual implementation, another division manner may be used.

Figure 10:
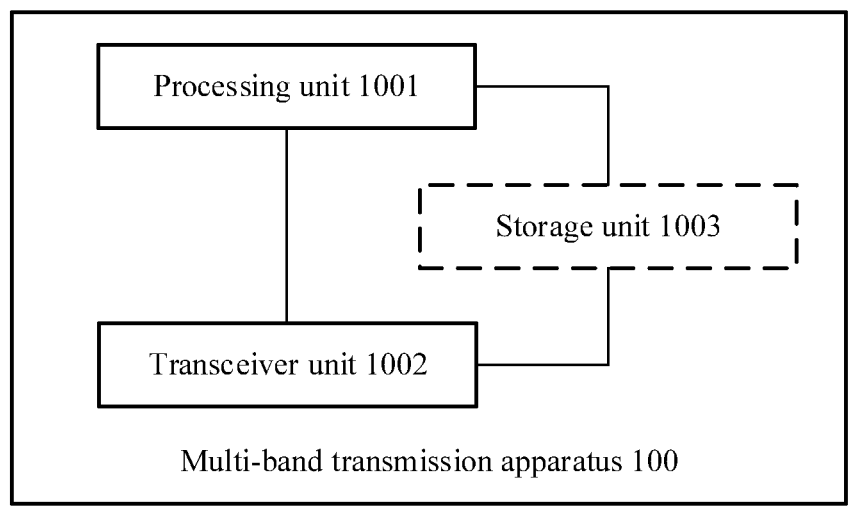
FIG. 10 is a schematic composition diagram of a multi-band transmission apparatus according to an embodiment of this application.

For example, when an integrated function module is used, FIG. 10 is a possible schematic structural diagram of the multi-band transmission apparatus in the foregoing embodiments. The multi-band transmission apparatus 100 may be the foregoing transmit end or receive end. Referring to FIG. 10, the multi-band transmission apparatus 100 may include a processing unit 1001 and a transceiver unit 1002. The apparatus may further include a storage unit 1003.

When the multi-band transmission apparatus 100 is the transmit end, the processing unit 1001 is configured to control and manage an action of the transmit end. For example, the processing unit 1001 is configured to support the transmit end in performing steps 401 and 402 in FIG. 4, step 701 in FIG. 7, steps 801 to 804 in FIG. 8, steps 901 to 904 in FIG. 9 and/or an action performed by the transmit end in another process described in the embodiments of this application. The transceiver unit 1002 is configured to support the transmit end in communicating with another network device, for example, communicating with the receive end in FIG. 4. The storage unit 1003 is configured to store program code and data of the transmit end.

When the multi-band transmission apparatus 100 is the receive end, the processing unit 1001 is configured to control and manage an action of the receive end. For example, the processing unit 1001 is configured to support the receive end in performing steps 402 to 406 in FIG. 4, steps 701 to 703 in FIG. 7, steps 801 and 804 in FIG. 8, steps 901 and 904 in FIG. 9 and and/or an action performed by the receive end in another process described in the embodiments of this application. The transceiver unit 1002 is configured to support the receive end in communicating with another network device, for example, communicating with the transmit end in FIG. 4. The storage unit 1003 is configured to store program code and data of the receive end.

The processing unit 1001 may be a processor or a controller, the transceiver unit 1002 may be a transceiver or transceiver pin, and the storage unit 1003 may be a memory. When the processing unit 1001 is a processor, the transceiver unit 1002 is a transceiver, and the storage unit 1003 is a memory, the multi-band transmission apparatus in this embodiment of this application may be the multi-band transmission apparatus 30 shown in FIG. 3.

When the multi-band transmission apparatus 30 is the transmit end, the processor 301 is configured to control and manage an action of the transmit end. For example, the processor 301 is configured to support the transmit end in performing steps 401 and 402 in FIG. 4, step 701 in FIG. 7, steps 801 to 804 in FIG. 8, steps 901 to 904 in FIG. 9 and/or an action performed by the transmit end in another process described in the embodiments of this application. The transceiver 302 is configured to support the transmit end in communicating with another network device, for example, communicating with the receive end in FIG. 4. The memory 303 is configured to store program code and data of the transmit end.

When the multi-band transmission apparatus 30 is the receive end, the processor 301 is configured to control and manage an action of the receive end. For example, the processor 301 is configured to support the receive end in performing steps 402 to 406 in FIG. 4, steps 701 to 703 in FIG. 7, steps 801 and 804 in FIG. 8, steps 901 and 904 in FIG. 9 and and/or an action performed by the receive end in another process described in the embodiments of this application. The transceiver 302 is configured to support the receive end in communicating with another network device, for example, communicating with the transmit end in FIG. 4. The memory 303 is configured to store program code and data of the receive end.

Figure 11:
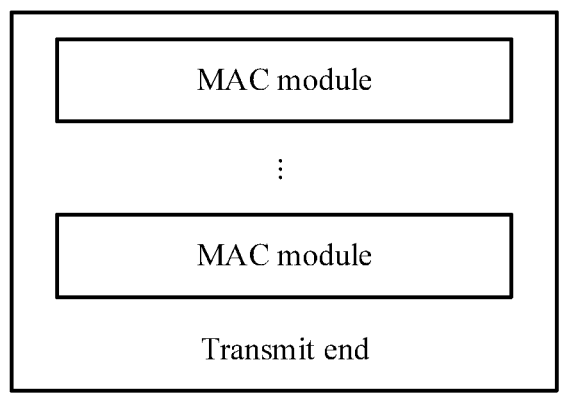
FIG. 11 is a schematic composition diagram of a transmit end according to an embodiment of this application.

In addition, as shown in FIG. 11, the transmit end in the embodiments of this application may include a plurality of MAC modules, the plurality of MAC modules may perform step 901 in FIG. 9, and a first MAC module in the plurality of MAC modules may perform steps 902 to 904 in FIG. 9, and/or an action performed by the first MAC module in another process described in the embodiments of this application. A hardware structure of the first MAC module may be the multi-band transmission apparatus 30 shown in FIG. 3. When exchanging information with another device or module, the first MAC module may use the transceiver 302, for example, perform steps 901 and 904 using the transceiver 302. When performing information processing, the first MAC module may use the processor 301, for example, perform steps 902 and 903 using the processor 301.

An embodiment of this application further provides a computer-readable storage medium, including an instruction. When the instruction is run on a computer, the computer is enabled to perform the foregoing method.

An embodiment of this application further provides a computer program product including an instruction. When the instruction is run on a computer, the computer is enabled to perform the foregoing method.

An embodiment of this application further provides a communications system, including a transmit end and/or a receive end. The transmit end is any transmit end in the foregoing embodiments, and the receive end is any receive end in the foregoing embodiments.

All or some of the foregoing embodiments may be implemented using software, hardware, firmware, or any combination thereof. When a software program is used to implement the embodiments, the embodiments may be implemented or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application.

According to the technical solutions provided in the embodiments of this application, the IEEE 802.11 protocol may be modified as follows.

In 10.24.3, "The recipient shall reassemble any complete MAC service data units (MSDUs) from buffered preceding MPDUs and indicate these to its higher layer. The recipient shall then release any buffers held by preceding MPDUs" (English: The recipient shall reassemble any complete MSDUs from buffered preceding MPDUs and indicate these to its higher layer. The recipient shall then release any buffers held by preceding MPDUs.) is modified to "If ConcurrentMultibandLabel is False, the recipient shall reassemble any complete MSDUs from buffered preceding MPDUs and indicate these to its higher layer. The recipient shall then release any buffers held by preceding MPDUs. If ConcurrentMultibandLabel is True, when receiving a BlockAckReq from band x, the recipient shall mark any preceding MPDUs (including the incomplete and missing ones) with state Ready_to_flush_band_x. An MPDU is marked with state Ready_to_flush if it is marked by all bands with Ready_to_flush_band_x. The recipient shall set NextToFlushSequenceNumber as the largest possible sequence number that allows any MPDUs prior to it are either successfully received or marked with state Ready_to_flush. The recipient shall reassemble any complete MSDUs from the buffered MPDUs with sequence number prior to NextToFlushSequenceNumber and release these to its higher layers" (English: If ConcurrentMultibandLabel is False, the recipient shall reassemble any complete MSDUs from buffered preceding MPDUs and indicate these to its higher layer. The recipient shall then release any buffers held by preceding MPDUs. If ConcurrentMultibandLabel is True, when receiving a BlockAckReq from band x, the recipient shall mark any preceding MPDUs (including the incomplete and missing ones) with state Ready_to_flush_band_x. An MPDU is marked with state Ready_to_flush if it is marked by all bands with Ready_to_flush_band_x. The recipient shall set NextToFlushSequenceNumber as the largest possible sequence number that allows any MPDUs prior to it are either successfully received or marked with state Ready_to_flush. The recipient shall reassemble any complete MSDUs from the buffered MPDUs with sequence number prior to NextToFlushSequenceNumber and release these to its higher layers.)

In 10.24.4, "If ConcurrentMultibandLabel is True, for each block ack agreement, the recipient maintains a MAC variable NextToFlushSequenceNumber. The NextToFlushSequenceNumber is initialized to the value of the Block Ack Starting Sequence Control field of the Add Block Ack Request (ADDBA) frame of the accepted block ack agreement" (English: If ConcurrentMultibandLabel is True, for each block ack agreement, the recipient maintains a MAC variable NextToFlushSequenceNumber. The NextToFlush- SequenceNumber is initialized to the value of the Block Ack Starting Sequence Control field of the ADDBA Request frame of the accepted block ack agreement.) is added.

In 10.24.4, "If a BlockAckReq frame is received, all complete MSDUs and Aggregate MSDUs (A-MSDUs) with lower sequence numbers than the starting sequence number contained in the BlockAckReq frame shall be passed up to the next MAC process. Upon arrival of a BlockAckReq frame, the recipient shall pass up the MSDUs and A-MSDUs starting with the starting sequence number sequentially until there is an incomplete or missing MSDU or A-MSDU in the buffer" (English: If a BlockAckReq frame is received, all complete MSDUs and A-MSDUs with lower sequence numbers than the starting sequence number contained in the BlockAckReq frame shall be passed up to the next MAC process. Upon arrival of a BlockAckReq frame, the recipient shall pass up the MSDUs and A-MSDUs starting with the starting sequence number sequentially until there is an incomplete or missing MSDU or A-MSDU in the buffer.) is modified to "If ConcurrentMultibandLabel is False, when a BlockAckReq frame is received, all complete MSDUs and A-MSDUs with lower sequence numbers than the starting sequence number contained in the BlockAckReq frame shall be passed up to the next MAC process. Upon arrival of a BlockAckReq frame, the recipient shall pass up the MSDUs and A-MSDUs starting with the starting sequence number sequentially until there is an incomplete or missing MSDU or A-MSDU in the buffer. If ConcurrentMultibandLabel is True, when a BlockAckReq frame is received from band x, the recipient shall mark any preceding MPDUs (including the incomplete and missing ones) with state Ready_to_flush_band_x. An MPDU is marked with state Ready_to_flush if it is marked by all bands with Ready_to_flush_band_x. The recipient shall set NextToFlushSequenceNumber as the largest possible sequence number that allows any MPDUs prior to it are either successfully received or marked with state Ready_to_flush. The recipient shall reassemble any complete MSDUs from the buffered MPDUs with sequence number prior to NextToFlushSequenceNumber and release these to its higher layers" (English: If ConcurrentMultibandLabel is False, when a BlockAckReq frame is received, all complete MSDUs and A-MSDUs with lower sequence numbers than the starting sequence number contained in the BlockAckReq frame shall be passed up to the next MAC process. Upon arrival of a BlockAckReq frame, the recipient shall pass up the MSDUs and A-MSDUs starting with the starting sequence number sequentially until there is an incomplete or missing MSDU or A-MSDU in the buffer. If ConcurrentMultibandLabel is True, when a BlockAckReq frame is received from band x, the recipient shall mark any preceding MPDUs (including the incomplete and missing ones) with state Ready_to_flush_band_x. An MPDU is marked with state Ready_to_flush if it is marked by all bands with Ready_to_flush_band_x. The recipient shall set NextToFlushSequenceNumber as the largest possible sequence number that allows any MPDUs prior to it are either successfully received or marked with state Ready_to_flush. The recipient shall reassemble any complete MSDUs from the buffered MPDUs with sequence number prior to NextToFlushSequenceNumber and release these to its higher layers.).

What is claimed is:

1. A multi-band transmission method, comprising:
receiving, by a receive end, data packets in parallel from a transmit end using M frequency bands, wherein the data packets belong to a same traffic stream, and wherein M is an integer greater than 1;
receiving, by the receive end, a block acknowledgment request (BAR) frame from the transmit end, wherein the BAR carries a start sequence number (SSN), wherein the BAR requests a receiving state of a sent data packet that is from the transmit end on an $m^{th}$ frequency band, and wherein the $m^{th}$ frequency band is any frequency band in the M frequency bands;
marking, by the receive end, an $m^{th}$ state for an unreceived data packet whose sequence number (SN) is before the SSN;
marking, by the receive end, one or more unreceived data packets with a discarded state when determining that the one or more unreceived data packets are marked with a first state, a second state, . . . , and an $M^{th}$ state;
determining, by the receive end, whether there is a first group of data packets with consecutive SNs, wherein any data packet in the first group of data packets is in a received state or the discarded state, and wherein a data packet that is with a minimum SN and that is in the first group of data packets to be processed by the receive end; and
submitting, by the receive end, at least one data packet in the received state when determining that there is the first group of data packets with consecutive SNs,
wherein the at least one data packet is in the first group of data packets.

2. The multi-band transmission method according to claim 1, wherein the BAR comprises information about the $m^{th}$ frequency band.

3. The multi-band transmission method according to claim 1, wherein the receive end comprises a media access control £MAC) protocol stack module and a logical link control (LLC) protocol stack.

4. The multi-band transmission method according to claim 1, wherein the data packet that is with the minimum SN and to be processed by the receive end is a first data packet.

5. The multi-band transmission method according to claim 1, wherein the BAR is received on the $m^{th}$ frequency band.

6. The multi-band transmission method according to claim 3, wherein submitting the at least one data packet comprises submitting, by the MAC protocol stack at the receive end, the at least one data packet to the LLC protocol stack at the receive end.

7. The multi-band transmission method according to claim 4, wherein when the receive end has submitted the at least one data packet, the first data packet is a next data packet of a last data packet in a second group of data packets with consecutive SNs that are determined by the receive end a last time, and wherein a second data packet submitted by the receive end the last time is a data packet that is in the received state and that is in the second group of data packets.

8. The multi-band transmission method according to claim 4, wherein when the receive end has submitted no data packet, the first data packet is a data packet whose SN is a start number of the SNs.

9. A receive end, comprising:
a transceiver configured to:
receive data packets in parallel from a transmit end using M frequency bands, wherein the data packets belong to a same traffic stream, and wherein M is an integer greater than 1; and
receive a block acknowledgment request (BAR) frame from the transmit end, wherein the BAR carries a start sequence number (SSN), wherein the BAR requests a receiving state of a sent data packet that is from the transmit end on an $m^{th}$ frequency band, and wherein the $m^{th}$ frequency band is any frequency band in the M frequency bands; and a processor coupled to the transceiver and is-configured to:

mark an $m^{th}$ state for an unreceived data packet whose sequence number (SN) is before the SSN;

mark one or more unreceived data packets with a discarded state when determining that the one or more unreceived data packets are marked with a first state, a second state, . . . , and an $m^{th}$ state;

determine whether there is a first group of data packets with consecutive SNs, wherein any data packet in the first group of data packets is in a received state or the discarded state, and wherein a data packet that is with a minimum SN and that is in the first group of data packets is to be processed by the apparatus; and submit at least one data packet in the received state when determining that there is the first group of data packets, wherein the at least one data packet is in the first group of data packets with the consecutive SNs.

10. The receive end according to claim 9, wherein the BAR comprises information about the $m^{th}$ frequency band, or the BAR is received on the $m^{th}$ frequency band.

11. The receive end according to claim 9, wherein the apparatus comprises a media access control (MAC) protocol stack module and a logical link control (LLC) protocol stack, and wherein the processor belongs to the MAC protocol stack and is further configured to submit the at least one data packet to the LLC protocol stack of the apparatus.

12. The receive end according to claim 9, wherein the data packet that is to be processed by the apparatus is a first data packet; and wherein when the apparatus has submitted the at least one data packet, the first data packet is a next data packet of a last data packet in a second group of data packets with consecutive SNs that are determined by the apparatus a last time, and wherein a second data packet submitted by the apparatus the last time is a data packet that is in the received state and that is in the second group of data packets with the consecutive SNs that are determined by the apparatus last time; or wherein when the apparatus has not submitted no data packet, the first data packet is a data packet whose SN is a start number of the SNs.

13. A computer program product comprising instructions stored on a non-transitory computer-readable medium that, when executed by a processor of a receive end, cause the receive end to implement a method comprising:

receiving data packets in parallel from a transmit end using M frequency bands, wherein the data packets carried belong to a same traffic stream, and wherein M is an integer greater than 1;

receiving a block acknowledgment request (BAR) frame from the transmit end, wherein the BAR carries a start sequence number (SSN), wherein the BAR requests a receiving state of a sent data packet that is from the transmit end on an $m^{th}$ frequency band, and wherein the $m^{th}$ frequency band is any frequency band in the M frequency bands;

marking an $m^{th}$ state for an unreceived data packet whose sequence number (SN) is before the SSN;

marking one or more unreceived data packets with a discarded state when determining that the one or more unreceived data packets are marked with a first state, a second state, . . . , and an $M^{th}$ state;

determining whether there is a first group of data packets with consecutive SNs, wherein any data packet in the first group of data packets is in a received state or the discarded state, and wherein a data packet that is with a minimum SN and that is in the first group of data packets is to be processed by the receive end; and submitting at least one data packet in the received state when determining that there is the first group of data packets, wherein the at least one data packet is in the first group of data packets with the consecutive SNs.

14. The computer program product according to claim 13, wherein the BAR comprises information about the $m^{th}$ frequency band.

15. The computer program product according to claim 13, wherein the receive end comprises a media access control (MAC) protocol stack and a logical link control (LLC) protocol stack.

16. The computer program product according to claim 13, wherein the data packet that is to be processed by the receive end is a first data packet.

17. The computer program product according to claim 16, wherein when the receive end has submitted the at least one data packet, the first data packet is a next data packet of a last data packet in a second group of data packets with consecutive SNs that are determined by the receive end a last time, and wherein a second data packet submitted by the receive end the last time is a data packet that is in the received state and that is in the second group of data packets.

18. The computer program product according to claim 16, wherein when the receive end has not submitted no data packet, the first data packet is a data packet whose SN is a start number of the SNs.

19. The computer program product according to claim 13, wherein the BAR is received on the $m^{th}$ frequency band.

20. The computer program product according to claim 15, wherein submitting the at least one data packet comprises submitting, by the MAC protocol stack at the receive end, the at least one data packet to the LLC protocol stack at the receive end.

* * * * *

UNITED STATES PATENT AND TRADEMARK OFFICE
CERTIFICATE OF CORRECTION

PATENT NO. : 11,843,464 B2
APPLICATION NO. : 17/182487
DATED : December 12, 2023
INVENTOR(S) : Ying Wang et al.

It is certified that error appears in the above-identified patent and that said Letters Patent is hereby corrected as shown below:

In the Claims

Claim 1, Column 24, Line 22: "data packets to be processed" should read "data packets is to be processed"

Claim 3, Column 24, Line 34: "control £MAC) protocol" should read "control (MAC) protocol"

Claim 3, Column 24, Line 34: "stack module and" should read "stack and"

Claim 9, Column 25, Line 6: "and is-configured" should read "and configured"

Claim 9, Column 25, Line 13: "an $m^{th}$ state;" should read "an $M^{th}$ state;"

Claim 11, Column 25, Line 30: "stack module and" should read "stack and"

Claim 11, Column 25, Line 31: "the MAC;" should read "the MAC"

Claim 12, Column 25, Lines 44-45: "packets with the consecutive SNs that are determined by the apparatus last time; or" should read "packets with; or"

Signed and Sealed this
Twenty-third Day of January, 2024

Katherine Kelly Vidal
*Director of the United States Patent and Trademark Office*